United States Patent Office 2,808,406
Patented Oct. 1, 1957

2,808,406

HYDROLYSIS OF 11,23-DIBROMO HECOGENIN ESTERS

Joseph Elks, London, and Gordon Hanley Phillipps, Greenford, England, assignors to G. N. R. D. Patent Holdings Limited, London, England, a British company No Drawing. Application April 25, 1955, Serial No. 503,778

Claims priority, application Great Britain April 30, 1954

16 Claims. (Cl. 260—239.55)

This invention is concerned with improvements in or relating to the preparation of steroid compounds useful in the synthesis from hecogenin of cortisone and related compounds.

In the synthesis of cortisone and related compounds from hecogenin, it is possible to proceed by conversion of an hecogenin ester into a diester of 3β:12β-dihydroxy-11-oxo-5α:22a spirostan. A sequence of reactions for effecting this conversion has been described by Djerassi et al. (J. Org. Chem. 1951, 16, 303) which consisted of brominating hecogenin acetate in acetic acid, refluxing the crude product with methanolic potassium hydroxide and removing the halogen from the 23-position by treatment with zinc and acetic acid; the yield of the crude 3β:12β-dihydroxy-11-oxo-5α:22a spirostan was stated as 65–69%. The true efficiency of the process cannot be assessed however as their product melted at 202°–207° C. whilst the melting point of the pure compound, according to the same authors is 215–217° C.

The sequence of reactions mentioned above, can be schematically represented as follows:

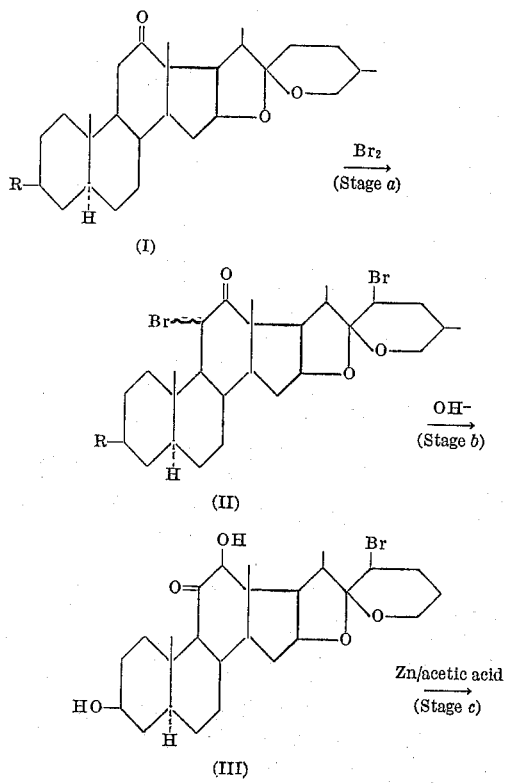

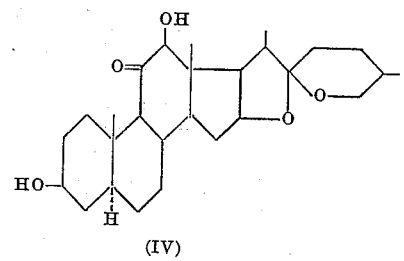

(where R is an esterified hydroxy group, in particular an acetoxy group as in the specific example quoted by Djerassi (loc. cit.)).

Later Mueller et al. (J. A. C. S. 1953, 75, 4892) carried out a similar sequence of reactions by brominating 23-bromo-hecogenin acetate in chloroform to give compound II, stage b of the reaction sequence being carried out in ethanolic, instead of methanolic, caustic potash. They also acetylated the product IV with acetic anhydride to give the corresponding diacetate, Formula V below,

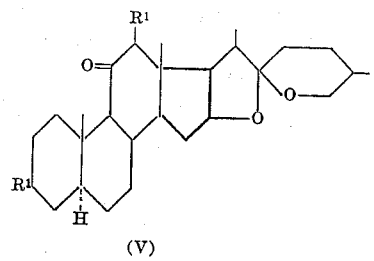

where $R^1$ is an esterified hydroxy group, in particular an acetoxy group in the specific example mentioned by Mueller et al. (loc. cit.). The yield of the diacetate from compound II was about 48% and about 17% from 23-bromo-hecogenin acetate.

We have carried out research to improve the yield of the diester product (V) produced in the sequence of reactions, described above from hecogenin esters. We have found that a surprisingly improved yield in stage b may be secured by the use of aqueous tertiary butanol or aqueous dioxan as solvents for the hydrolysis in place of methanol or ethanol as previously proposed. The use of dioxan is also advantageous in that this solvent may also serve as solvent in the bromination of the hecogenin ester with the result that it is unnecessary to isolate the bromo-intermediate (II); thus, for example, after bromination of (I) in dioxan it is only necessary to add aqueous alkali and to proceed straight away with the hydrolysis and re-arrangement.

According to the present invention, therefore, we provide a process for the preparation of 3β:12β-dihydroxy-11-oxo-23-bromo-5α:22a-spirostan in which an 11:23-dibromo-hecogenin ester is hydrolysed with caustic alkali in solution in aqueous tertiary butanol or aqueous dioxan.

We have found also that the most satisfactory temperatures for the conduct of stage b lie between 70° C. and the boiling point of the solvent used; it is most convenient to operate at the boiling point of the solvent. The concentration of alkali in stage b desirably lies between 0.5–15% by weight, preferably between 2.5 and 10% by weight. The time required for completion of stage b varies, of course, with the alkali concentration and temperature of reaction. It is best to determine the optimum time by means of trial experiments. Where pure starting materials are used this may be done by testing the reaction product from time to time with Girard's reagent P for the presence of a reactive carbonyl group; absence of a reactive carbonyl group as found in this way will indicate that the reaction is complete. However it is commonly found that the starting material for stage *b*, namely 11:23-dibromo-hecogenin acetate, is contaminated with hecogenin acetate, which is, of course, unchanged by the alkali treatment and which will give a positive reaction with Girard P reagent. Where the starting material is contaminated in this way the test for completion of the reaction described above is therefore unreliable.

We find further that it is preferable to esterify product (III) before proceeding with the removal of the 23-bromine atom by treatment with zinc and acetic acid as a product of better quality may thus be obtained. The esterification advantageously takes the form of acetylation, for example by means of acetic anhydride in pyridine. It is further advantageous then to reheat the mother liquors resulting from the production of (V), with alkali in aqueous dioxan or aqueous tertiary butanol, followed by further esterification; in this way a further yield of (V) may often be obtained. Alternatively, or in addition, to this alkaline treatment, it is advantageous to purify the mother liquors resulting from the production of (V) by treatment with Girard P reagent, thus removing any hecogenin acetate present; this procedure renders the purification of residual (V) considerably easier.

In order that the invention may be well understood the following examples are given only as illustrations:

EXAMPLE 1

*Preparation of 3β:12β-diacetoxy-11-oxo-5α:22a-spirostan from hecogenin acetate*

(*a*) Using acetic acid for bromination and methanol for alkali treatment (cf. Djerassi, Martinez and Rosenkranz, J. Org. Chem., 1951, 16 303): Hecogenin acetate (20.0 g.) in acetic acid (600 ml.) containing 2 drops of 4 N-hydrogen bromide in acetic acid was warmed to 35° and the resultant solution was treated dropwise with a solution of bromine (12.4 ml.) in glacial acetic acid (200 ml.) over ten minutes. After one and a half hours at room temperature the solution was diluted with water (ca. 5 litres) and the precipitate was collected and dried. Yield 26.5 g.

The crude dibromohecogenin acetate (13.25 g.; from 10 g. hecogenin acetate) was refluxed for two hours with potassium hydroxide (77 g.) in methanol (400 ml.); the product was poured into water and the precipitate collected and washed well with water. The dried solid was debrominated by refluxing for 2.5 hours, with stirring with zinc (75 g.) in acetic acid (420 ml.). The zinc was removed by filtration from the hot solution, and washed with hot glacial acetic acid (100 ml.). The filtrate was diluted with much water (ca. 4 litres) and the precipitate collected and dried. Yield 8.5 g.

The crude product was acetylated by refluxing in acetic anhydride (75 ml.) and pyridine (75 ml.) for one hour. The acetylating mixture was removed by distillation under reduced pressure and the residue was then refluxed with ethyl alcohol (200 ml.) in order to destroy any remaining acetic anhydride. The alcohol was removed under reduced pressure and the residue crystallised from ethanol (240 ml.) to give the 3β:12β-diacetoxy-11-oxo-5α:22a-spirostan as crystals, M. P. 222–225°, $[\alpha]_D$ −78° (c.=1 in CHCl$_3$). Yield 5.4 g. (48.5%).

(*b*) Using acetic acid for bromination and tert.-butanol for alkali treatment: The crude dibromohecogenin acetate (13.25 g.), prepared as in (*a*), was refluxed with stirring in tert.-butanol (125 ml.) and water (125 ml.) containing sodium hydroxide (6.25 g.). After six hours the tert.-butanol was removed by distillation under reduced pressure. The resultant suspension was filtered and the solid washed with water. It was debrominated as in (*a*) to give a crude product (9.2 g.). This was acetylated as in (*a*) and the product crystallised from ethanol (250 ml.) to give 3β:12β-diacetoxy-11-oxo-5α:22a-spirostan as crystals M. P. 222–225°, $[\alpha]_D$ −78° (c.=1 in CHCl$_3$). Yield 8.05 g. (71.5%).

(*c*) Bromination and alkali treatment in aqueous dioxan: Hecogenin acetate (25.0 g.) in dioxan (250 ml.) was brominated by the addition of bromine (6.0 ml.). All the solid went into solution in a few minutes. After being stirred for forty minutes at room temperature a solution of sodium hydroxide (25.0 g.) in water (250 ml.) was added and the mixture refluxed for six hours. The dioxan was then removed under reduced pressure, and the aqueous residue diluted with water (1 litre). The oil which separated, solidified overnight and the solid was collected by filtration. It was acetylated and debrominated as in 2(*a*) below. The crude product was crystallised from ethanol (ca. 600 ml.) to give the 3β:12β-diacetoxy-11-oxo-5α:22a-spirostan (19.6 g.; 70%) of M. P. 221–225°, $[\alpha]_D$ −78° (c.=1 in CHCl$_3$).

EXAMPLE 2

*Preparation of 3β:12β-diacetoxy-11-oxo-5α:22a-spirostan from pure 11α:23-dibromohecogenin acetate*

(*a*) Using aqueous tertiary butanol: Purified 11α:23-dibromohecogenin acetate (10.0 g.) was refluxed with stirring in tert.-butanol (250 ml.) and water (250 ml.) containing sodium hydroxide (12.5 g.). After six hours refluxing the tert.-butanol was distilled under reduced pressure to leave a suspension of the 23-bromo-ketol. This was collected by filtration, washed with water and dried. Yield 8.34 g. (quantitative). This product gave less than 1% of material forming a Girard derivative. The part which did not form a Girard derivative was acetylated by heating for one hour at 100° in pyridine (30 ml.) and acetic anhydride (30 ml.).

After removal of the acetylating mixture by distillation under reduced pressure (traces of acetic anhydride being destroyed by refluxing with methanol followed by removal of solvent) the total product was debrominated by refluxing for two hours in glacial acetic acid (100 ml.) with acid washed zinc dust (40 g.). The product was filtered hot and the zinc dust washed with hot acetic acid (25 ml.). The combined filtrates were diluted with water (2.5 litres) and the product collected by filtration. Yield 7.37 g.

This material was crystallised from ethanol (ca. 200 ml.) to give 3β:12β-diacetoxy-11-oxo-5α:22a-spirostan (65%) of M. P. 223–226°, $[\alpha]_D^{20}$ −79° (c.=1 in CHCl$_3$).

(*b*) Using aqueous dioxan: Purified 11α:23-dibromohecogenin acetate (20.0 g.) was refluxed with stirring for six hours in dioxan (100 ml.) and water (100 ml.) containing sodium hydroxide (20 g.). The product was poured into water (1000 ml.) and after standing overnight the originally gummy deposit had solidified and was collected by filtration. After treatment with Girard reagent P (which removed less than 1%) the unreacted part (97%) was acetylated and then debrominated as in 2(*a*). The crude product (91%) on crystallisation from ethanol (320 ml.) gave 3β:12β-diacetoxy-11-oxo-5α:22a-spirostan (65.7%) of M. P. 223–225°, $[\alpha]_D^{20}$ −77° (c.=1 in CHCl$_3$).

The second crops (4.2 g.) obtained by dilution of the crystallisation mother liquors with water had M. P. 160–180°, $[\alpha]_D$ −55°. They were refluxed in dioxan (80 ml.) and water (80 ml.) containing sodium hydroxide (4.0 g.) for twenty hours. The product was obtained by dilution with water followed by filtration. It was reacetylated in acetic anhydride and pyridine at 100° and then crystallised from ethanol (ca. 100 ml.) to give a further quantity of 3β:12β-diacetoxy-11-oxo-5α:22a-spirostan of M. P. 218–223°, $[\alpha]_D$ −78° (c.=1 in CHCl$_3$). Yield 1.7 g. (10%).

Hence total yield is 76%.

EXAMPLE 3

*Preparation of 3β:12β-diacetoxy-11-oxo-5α:22a spirostan from crude 11α:23-dibromohecogenin acetate*

(a) Crude dibromohecogenin acetate was refluxed with stirring for six hours in tert.-butanol (267 ml.) and water (2670 ml.) containing sodium hydroxide (133.5 g.). The tert.-butanol was removed by distillation under reduced pressure and after addition of water (ca. 3 litres) to the resultant aqueous suspension the solid was collected by filtration, washed with water and dried. Yield 112.5 g.

The crude material was acetylated by refluxing for one hour in acetic anhydride (670 ml.) and pyridine (670 ml.), and the acetylating mixture was then removed by distillation under reduced pressure. The product was refluxed for thirty minutes in methanol (1000 ml.) followed by removal of solvent under reduced pressure. Acetic acid (300 ml.) was then added, and removed under reduced pressure.

The residue was dissolved in glacial acetic acid (1200 ml.), and zinc dust (400 g.) was added to the warm solution. The mixture was stirred under reflux for two and a half hours and the zinc was then filtered from the hot solution and washed with boiling acetic acid (3 x 200 ml.).

The combined filtrates were gradually diluted while hot with water (ca. 4 volumes) and, after cooling, the crystalline ketol diacetate was collected by filtration, washed with water and dried. Yield 105 g.

This crude product was crystallised from methylated spirit (ca. 2700 ml.) to give pure 3β:12β-diacetoxy-11-oxo-5α:22a-spirostan (86.5 g.; 77.1%) of M. P. 223–226°, $[\alpha]_D$ —79° ($CHCl_3$).

The mother liquors of the crystallisation were concentrated to ca. 200 ml. and diluted to ca. 1 litre with water. The precipitate was collected by filtration and dried. Yield 17.5 g. This was refluxed for one hour in methylated spirit (175 ml.) and acetic acid (17.5 ml.) with Girard reagent P (9 g.). After cooling, it was poured into a solution of sodium bicarbonate (28 g.) in water (700 ml.) covered with a layer of ether. The aqueous phase was extracted with ether and the ether extract washed with water. Removal of solvent from the dried extract left a crude residue, which, after two crystallisations from ethylated spirit gave 3β:12β-diacetoxy-11-oxo-5α:22a-spirostan (6.85 g., 6.1%) of M. P. 221–225°, $[\alpha]_D$ —78° ($CHCl_3$).

Hence total yield was 83.2%.

(b) 3β:12β-hydroxy-11-oxo-23-bromo-5α:22a-spirostan obtained from the first stage (first paragraph) of (a) above in acetic anhydride (590 ml.) and pyridine (8 ml.) was heated up to 120° during thirty minutes and held at that temperature for ninety minutes. Water (110 ml.) was cautiously added to the solution, and the mixture was refluxed for one and a half hours.

To the cooled resultant solution of crude 3β:12β-diacetoxy-11-oxo-23-bromo-5α:22a-spirostan in acetic acid, zinc dust (90 g.) was added, and the mixture refluxed with stirring for two hours. The ketol diacetate (V) was isolated as described in the previous example, and after crystallisation (with Girard treatment) a first crop of 3β:12β-diacetoxy-11-oxo-5α:22a-spirostan, M. P. 224–229°, $[\alpha]_D$ —79° ($CHCl_3$) (67.3 g., 66.5%) was obtained.

Whilst the process, the subject of this invention, has been described with particular reference to the use of compounds in which the hydroxy group at position 3 is protected by an acetyl group, it will be obvious to those skilled in the art that other equivalent ester groupings may be used in place thereof. Thus the hydrolysis may be effected upon all dibromohecogenin esters: we particularly prefer esters of hydrocarbon carboxylic acids containing up to 10 carbon atoms, such as acetic, propionic, butyric, valeric, caproic, capryllic, benzoic, toluic and phenylacetic acids. Esters of substituted hydrocarbon carboxylic acids may, of course, equally be used, such as esters of chloracetic, bromacetic, hydroxyacetic, and other analogous substituted acids. Where the compound of Formula III, namely 3β:12β-dihydroxy-11-oxo-23-bromo-5α:22a-spirostan, is to be esterified before debromination, this is preferably effected by acetylation; other esters may, of course, be made, particularly those of the acids specifically mentioned above.

We claim:

1. A process for the preparation of 3β:12β-dihydroxy-11-oxo-23-bromo-5α:22a-spirostan in which an 11:23-dibromohecogenin ester is hydrolysed with caustic alkali in solution in a solvent medium selected from the group consisting of aqueous tertiary butanol and aqueous dioxan.

2. A process as claimed in claim 1 wherein said caustic alkali is sodium hydroxide.

3. A process as claimed in claim 1 wherein said caustic alkali is potassium hydroxide.

4. A process for the preparation of 3β:12β-dihydroxy-11-oxo-23-bromo-5α:22a-spirostan in which an 11:23-dibromohecogenin ester is hydrolysed with a caustic alkali present in a concentration of between 0.5 and 15% by weight, in solution in a solvent medium selected from the group consisting of aqueous tertiary butanol and aqueous dioxan.

5. A process as claimed in claim 4 wherein said caustic alkali is sodium hydroxide.

6. A process as claimed in claim 4 wherein said caustic alkali is potassium hydroxide.

7. A process as claimed in claim 4 wherein said alkali is present in a concentration of between 2.5 and 10% by weight.

8. A process as claimed in claim 4 wherein the hydrolysis is carried out at a temperature between 70° C. and the boiling point of the solvent medium used.

9. A process for the preparation of 3β:12β-dihydroxy-11-oxo-23-bromo-5α:22a-spirostan comprising the steps of dibrominating a hecogenin ester in solution in dioxan, to form an 11:23-dibromo-hecogenin ester, adding aqueous caustic alkali to the reaction mixture on completion of the bromination and hydrolysing the 11:23-dibromo-hecogenin ester.

10. A process as claimed in claim 9 wherein said caustic alkali is sodium hydroxide.

11. A process as claimed in claim 9 wherein said caustic alkali is potassium hydroxide.

12. A process for the preparation of 3β:12β-dihydroxy-11-oxo-23-bromo-5α:22a-spirostan comprising the steps of dibrominating a hecogenin ester in solution in dioxan to form an 11:23-dibromo-hecogenin ester, adding aqueous caustic alkali to the reaction mixture on completion of the bromination to produce a concentration of caustic alkali in the reaction mixture between 0.5 and 15% by weight and hydrolysing the 11:23-dibromo-hecogenin ester.

13. A process as claimed in claim 12 wherein said caustic alkali is sodium hydroxide.

14. A process as claimed in claim 12 wherein said caustic alkali is potassium hydroxide.

15. A process as claimed in claim 12 wherein the concentration of caustic alkali produced in the reaction mixture is between 2.5 and 10% by weight.

16. A process as claimed in claim 12 wherein the hydrolysis step is carried out at a temperature between 70° C. and the boiling point of the solvent medium used.

References Cited in the file of this patent

UNITED STATES PATENTS 2,734,899    Leigh  ---------------- Feb. 14, 1956

OTHER REFERENCES

Djerassi: J. Org. Chem., 1951, vol. 16, pp. 303–08.